Sept. 22, 1959 D. J. GREEN 2,905,384

CARRIER-MODULATING FUNCTION GENERATOR WITH ADAPTATION FOR SIMULTANEOUS MULTIPLICATION

Filed Sept. 20, 1954

INVENTOR.
DAVID JORDAN GREEN,
BY
[signature]
ATTORNEY.

United States Patent Office 2,905,384

Patented Sept. 22, 1959

2,905,384

CARRIER-MODULATING FUNCTION GENERATOR WITH ADAPTATION FOR SIMULTANEOUS MULTIPLICATION

David J. Green, Pacific Palisades, Calif., assignor to Gilfillan Bros. Inc., Los Angeles, Calif., a corporation of California Application September 20, 1954, Serial No. 457,223

10 Claims. (Cl. 235—194)

This invention relates to a carrier-modulating function generator with adaptation for simultaneous multiplication and, more particularly, to a circuit for amplitude modulating a previously constant amplitude carrier in accordance with a predetermined function, the modulation operation being adaptable to control one or more simultaneous multiplications of other variables.

The prior art has provided many types of function generators; the general status of the art being summarized on pages 245 through 261 of a book entitled "Electronic Analog Computers" by Korn and Korn, published in 1952 by McGraw-Hill publishing company. As indicated in this reference a typical electrical approach to the problem has been to control the position of the scanning beam of a cathode-ray tube in accordance with a signal derived through a mask having a shape representing a predetermined function. The output signal derived through scanning the mask is utilized to stabilize the beam at the boundary of the mask through a feedback arrangement. In a specific situation the feedback arrangement may comprise the cathode-ray tube for beam scanning the mask, a photocell for receiving light signals resulting in the scanning, and a vertical deflection amplifier for stabilizing the beam at the boundary of the mask.

In the feedback arrangement of the prior art the vertical deflection amplifier provides a varying direct-current signal which represents the predetermined function of the mask. This function may be considered to be the product of an "$x$" deflection function of time, hereafter referred to as $x(t)$, and a "$y$" deflection function, providing a composite function which may be referred to as $y[x(t)]$.

Situations frequently arise in the analog computing field, as well as in the telemetering field, where it is necessary to utilize the composite function $y[x(t)]$ to perform a further multiplication, or to perform an equivalent modulation operation upon a carrier. In either of these situations addition circuits are required. Thus, in situations where a predetermined composite function has to be multiplied by an independent variable, the utilization of the prior art function generator requires an additional analog multiplier stage. In a similar manner, the telemetric transmission of a predetermined function as the modulation component of a carrier necessitates an additional modulator circuit.

In addition to requiring additional circuits for multiplication or modulation, the conventional technique introduces further errors into the operation due to the cumulative effect of the separate errors inherent in the independently operating circuits.

The present invention obviates the above and other disadvantages inherent in the prior art by providing a carrier-modulating function generator wherein the function generator feedback control circuit also provides a modulated carrier in accordance with the predetermined function desired. This means that the modulation is performed directly with the same accuracy as is inherent in the feedback control circuit of the function generator.

In addition, the direct modulation approach of the invention readily lends itself to the simultaneous multiplication of the predetermined function and a number of other independent variables.

According to the basic concept of the invention, the beam scanning in the function generator is controlled by a carrier which is passed through a variable gain amplifier, forming part of the function generator feedback circuit, to produce a modulated carrier in accordance with the predetermined function. The feedback loop is completed through a reading circuit, which may be a photocell and amplifier combination, providing an output signal indicating when the carrier peaks reach the boundary of the function-indicating device, which may be a mask. Essentially the output signal produced is an automatic gain control signal which is utilized to depress the gain of the variable gain amplifier to stabilize the peaks of the carrier at values representing the desired function.

Since the gain of the variable gain amplifier is accurately controlled through the feedback circuit in accordance with the predetermined function, the same gain control may be utilized to modulate or multiply a number of other variables represented by corresponding signals. Thus, if the variable gain amplifier is selected so that it is capable of amplifying a range of frequencies without distortion, a plurality of different variable-representing signals within this frequency range may be modulated or multiplied by the predetermined function. The variable gain amplifier then produces a plurailty of output signals corresponding to the number of input variables which may be separated through as many band-pass filter stages providing the appropriate frequency separation. One of the signals selected may, of course, be at a zero frequency being the equivalent of a varying direct-current signal.

Accordingly, it is an object of the present invention to provide a carrier-modulating function generator where modulation or multiplication may be performed without requiring modulation or multiplication circuits in addition to those circuits required for function generating alone.

Another object is to provide a function generator which may be utilized to directly modulate a carrier according to a predetermined function, obviating a separate modulator circuit.

A further object is to provide a function generator which may be utilized to directly multiply a predetermined function by one or more variables represented by corresponding signals of different frequencies, without necessitating a separate multiplication circuit.

Still another object is to provide a function generator circuit which may multiply or modulate a variable in accordance with a predetermined function with an accuracy inherent in function generating itself, no additional errors being introduced for separate operations of multiplication or modulation.

The novel features which are believed to be characteristic of the invention, both as to its organization and method of operation, together with further objects and advantages thereof, will be better understood from the following description considered in connection with the accompanying drawings, in which two embodiments of the invention are illustrated by way of examples. It is to be expressly understood however, that the drawings are for the purpose of illustration and description only, and are not intended as a definition of the limits of the invention.

Figures 1, 2A:
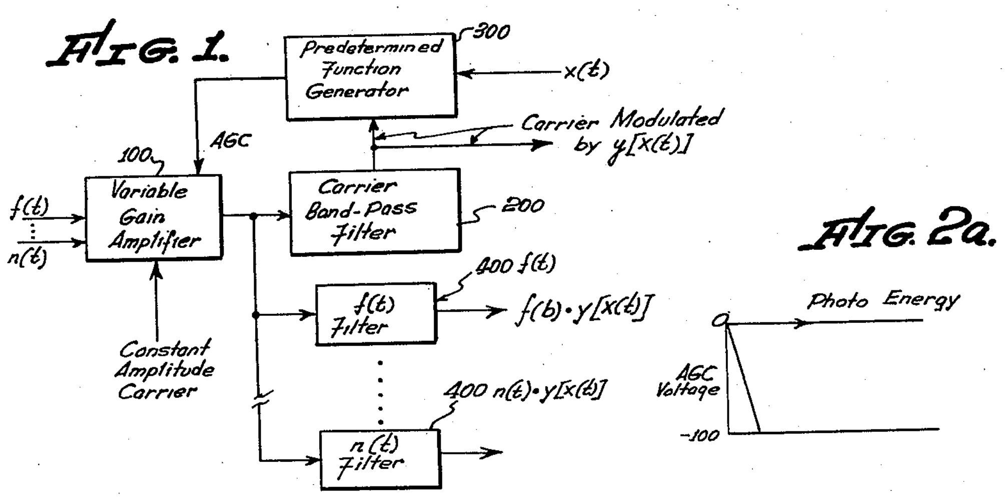
Fig. 1 is a block diagram of the basic embodiment of the invention.
Fig. 2*a* illustrates the light-response characteristic of the photocell in the embodiment of Fig. 2.

Reference is now made to Fig. 1 showing a block diagram of the basic embodiment of carrier-modulating function generator, according to the present invention. As indicated in Fig. 1 a constant amplitude carrier signal is applied to a variable gain amplifier stage 100 which also receives signals $f(t) \ldots n(t)$ representing other signal variables which may be modulated or multiplied, as will be explained. The letter "*n*" is utilized to represent the fact that zero or any integral number of signal variables may be applied to circuit 100. Thus, *n* may be 0, 1, 2, . . . etc.

The output signals produced by amplifier 100 are applied to a carrier band-pass filter stage 200 which separates the carrier frequency from other frequencies which may be utilized to represent other variables. The output signal of circuit 200 then is the carrier modulated by $y[x(t)]$ as the result of the feedback control, which will be described. The carrier modulated with signal $y[x(t)]$ is then utilized to control the *y* deflection of the scanning beam in a predetermined function generator circuit 300, which also receives an *x*-deflection function $x(t)$.

Figure 2:
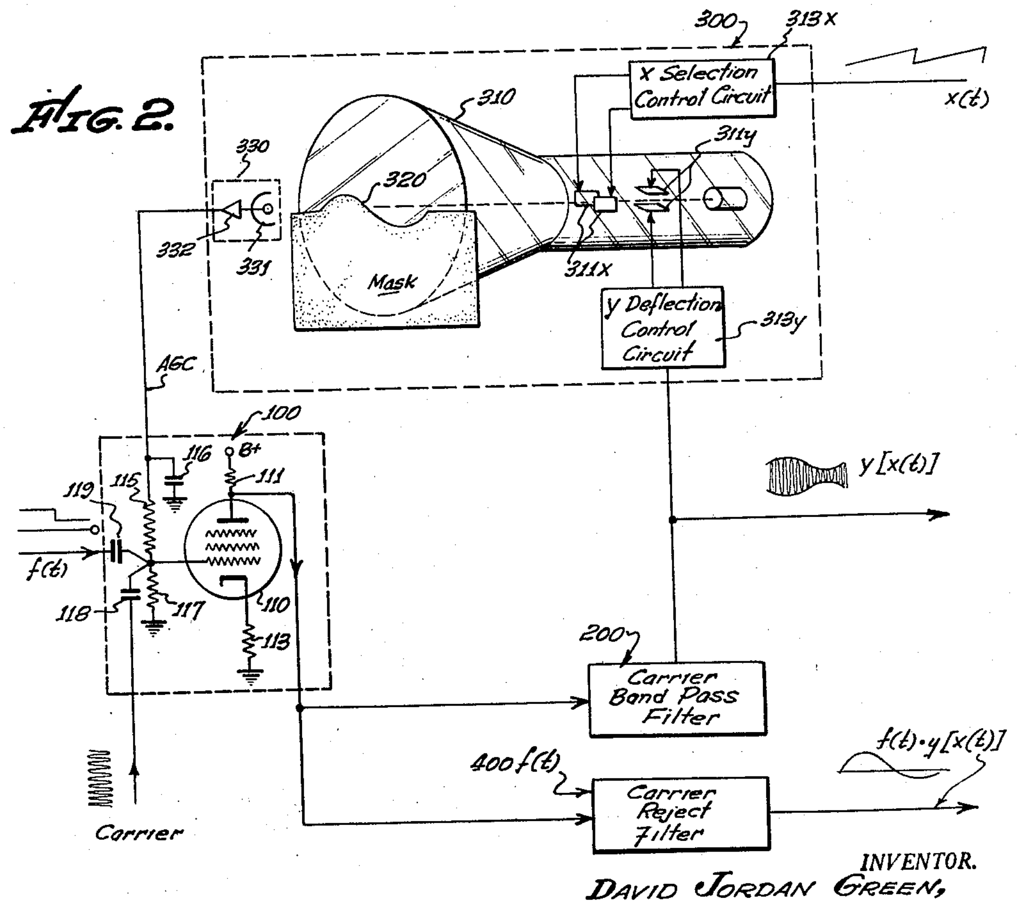
Fig. 2 is a schematic diagram of one form of the invention where the function generator is a photoformer and the photoformer feedback control circuit is also utilized for multiplication.

Function generator 300 includes a reading circuit which produces an output signal indicating when the peaks of the modulated carrier derived through circuit 200 assume the level of the predetermined function desired. A particular form of reading circuit is illustrated in Fig. 2 where the photoformer is considered. The output signal produced by the reading circuit is amplified and is applied as an automatic gain control signal AGC to amplifier 100. The description thus far completes the feedback loop for function generator 300 since the carrier peak amplitudes are continuously monitored through the reading circuit of function generator 300 so that the *y* deflection signal assumes the desired values representing $y[x(t)]$ at each peak.

Since the feedback monitoring may be very accurately regulated, the gain of amplifier 100 is accurately stabilized at the proper value for producing $y[x(t)]$ at each carrier peak. Thus if amplifier 100 is selected so that it has the same gain characteristic for all variable-representing signal frequencies, a plurality of signal variables $f(t) \ldots n(t)$ may also be modulated or multiplied by the predetermined function $y[x(t)]$. Amplifier 100, therefore, may be utilized to produce a plurality of multiplied or modulated output signals while simultaneously operating in the feedback circuit of generator 300. The output signals are then separated through corresponding filter stages 400$f(t) \ldots$ 400$n(t)$, providing output signals representing the functions $f(t).y[x(t)] \ldots n(t).y[x(t)]$, respectively.

A specific form of carrier-modulating function generator, according to the present invention, where a photoformer constitutes function generator 300 is shown in Fig. 2. In addition, one specific form of variable gain amplifier is illustrated for circuit 100. Furthermore, a typical operation of the invention is illustrated by showing typical variable-representing wave forms and a sinusoidal-function mask.

As indicated in Fig. 2, the photoformer circuit includes a cathode-ray tube 310 having *x*-deflection plates 311*x* and *y*-deflection plates 311*y*. Deflection voltages are supplied to these deflection plates through *x* and *y* deflection control circuit 313*x* and 313*y*, respectively. The cathode ray tube beam is directed to scan a mask 320 which is cut to represent the desired predetermined function, assumed as an illustration to be a sinusoid. Any light which results in scanning the boundary of mask 320 is detected by a reading circuit 330 including a photocell 331 and an amplifier 332. The response characteristic of photocell 331 is shown in Fig. 2*a*, which is discussed below.

The *x* and *y* deflection circuits are assumed to be conventional circuits which are well known in the electronic art and therefore are not shown in detail. In a similar manner band-pass filters 200 and 400$f(t)$ are assumed to be conventional filters which are designed to pass the corresponding signal frequencies as well as side bands resulting from function modulation or multiplication.

Variable gain amplifier stage 100 is indicated as including a remote cut-off pentode 110 which may, for example, be tube type 6SK7. In practice a multiplicity of such tubes in cascade would be used to achieve effective control. Tube 110 receives B+ anode potential through a load resistor 111 and has its cathode coupled through a cathode load resistor 113 to ground. The AGC potential provided by amplifier 332 is applied through a grid input resistor 115 to the grid of pentode 110. A bypass condenser 116 shunts resistor 115 to pass noise signals to ground. The grid of tube 110 is also connected by a load resistor 117 to ground. The carrier and signal variable $f(t)$ are applied to the grid of tube 110 through capacitors 118 and 119, respectively. The bias for tube 110 is adjusted so that it operates on its remote cut-off variable gain portion of its tube characteristic curve. Furthermore, the gain is adjusted so that a zero or small photocell signal results in high or maximum gain and so that a very slight change in photocell energy as amplified by stage 331 depresses the gain of tube 110 to zero or a very low level. The general relationship between photo energy and the AGC control signal which results is shown in Fig. 2*a*. It will be noted that a very slight change in photo energy depresses the AGC voltage to its minimum level.

A typical operation of the invention will be described in connection with the illustrative wave forms shown in Fig. 2. It will be noted that the function $x(t)$ is assumed to be a linear function of time represented by a sawtooth signal applied to *x* deflection circuit 313*x*. It will be understood, of course, that any other function could have been selected. The independent variable is assumed to be a step function $f(t)$ represented by a corresponding signal applied to amplifier 100. The carrier is shown as being applied to the grid of tube 110 through capacitor 118, and the *y* function of mask 320 is shown to be a sinusoid.

The carrier is modulated through amplifier 100 to provide an output signal $y[x(t)]$ indicated to be the carrier modulated by the sinusoidal function of the mask during the scanning interval defined by $x(t)$. This signal may be utilized directly as telemetric data to be transmitted and is also utilized in the feedback circuit of photoformer 300 to control *y* deflection control circuit 313*y*. The gain of tube 110 is accurately regulated at the peaks of the modulated carrier since reading circuit 330 produces a sharply changing output signal whenever light is detected at the boundary of mask 320. Thus the peaks of the carrier are quite accurately modulated so that the scanning beam of the photoformer just barely reaches the boundary of the mask and then returns during the completion of the carrier cycle.

The accurately regulated gain of amplifier 100 may then be utilized to multiply the function $f(t)$ by the function $y[x(t)]$ producing a function $f(t).y[x(t)]$ derived through a carrier reject filter 400$f(t)$.

From the foregoing description it is apparent that the present invention provides a carrier-modulating function generator where modulation or multiplication may be performed without requiring additional circuits. Thus in one form the invention may provide a simple, but highly accurate, telemetering circuit where the carrier is directly modulated in accordance with a predetermined function. Or, in an alternate form, the invention may provide a simple analog multiplier where a function generating operation and multiplication are performed simultaneously without additional circuits and associated errors.

The invention has been described in detail in connection with the utilization of a photoformer. It will be understood, however, that many other electrical feedback circuits are available for providing the same operation; typical variations being illustrated in the above-mentioned book by Korn and Korn.

It has been pointed out that the invention may be practiced with any number of variables $f(t) \ldots n(t)$, where $n$ represents any number including zero. When $n$ is zero the invention is in its simplest carrier-modulating form which may be desired for telemetering or because of a preference for A.C. amplifier circuits over D.C. amplifier circuits and the associated problems in drift and stabilization.

What is claimed is:

1. A function generating system for modulating an input carrier signal in accordance with a predetermined function, said system comprising: a function generating device; deflection means for applying an $x$ and a carrier-modulated $y$ deflection signal to said device, said deflection signals representing the functions $x(t)$ and $y[x(t)]$, respectively, said device including a reading circuit for producing a boundary signal indicating when said carrier-modulated $y$ deflection signal assumes an amplitude corresponding to the function $y[x(t)]$; means for receiving the carrier signal and for producing a carrier signal modulated in amplitude solely by said boundary signal; and means for applying said amplitude-modulated carrier signal to said deflection means.

2. A system for modulating a carrier of one frequency and simultaneously multiplying signals of different frequencies representing the functions $f(t) \ldots n(t)$, by and in accordance with a predetermined function $y[x(t)]$, said system comprising: first means actuable to produce a boundary signal when an applied $y$ deflection signal assumes a level representing the function $y[x(t)]$; second means for applying an $x$ deflection signal to said first means representing said boundary signal produced by said first means; third means for applying a $y$ deflection signal to said first means and for receiving the input carrier, said third means being operable to produce a modulated output signal solely constituting said $y$ deflection signal and solely representing said function $y[x(t)]$; and fourth means for applying said signals of different frequencies to said third means; said third means producing corresponding signals representing the functions $f(t).y[x(t)] \ldots n(t).y[x(t)]$; fifth means for separating the resulting signals representing different functions; and sixth means for impressing said $y[x(t)]$ on said third means.

3. A circuit for varying the peak amplitudes of an input carrier in accordance with a specified function of an independent variable, said circuit comprising: a function generating device actuable to produce $y$-peak signals indicating when applied $y$ variable signals have respective amplitudes equal to the specified function; $x$ control means coupled to said device for producing an $x$ variable signal corresponding to said first independent variable; and a variable gain feedback circuit responsive solely to said $y$-peak signals for varying the peak amplitudes of the input carrier to produce said $y$ variable signals for actuating said device.

4. The circuit defined in claim 3 wherein said function generating device is a photoformer including a cathode-ray tube and a function mask, said $y$-peak signals being derived by scanning said mask in a $y$-deflection direction until the cathode-ray tube beam reaches the boundary of said mask.

5. A system for modulating the peaks of an input carrier of one frequency in accordance with a predetermined function $y[x(t)]$, where $x(t)$ is a first independent variable, and for simultaneously multiplying the function $y[x(t)]$ by a second independent variable $f(t)$, said system comprising: first means controllable to produce $y$ boundary signals indicating when an applied $y$ amplitude signal represents the predetermined function $y[x(t)]$; second means for applying a signal representing $x(t)$ to said first means to control a corresponding $x$ amplitude positioning of said $y$ amplitude signals; third means for modulating the peaks of the input carrier solely in response to said $y$ boundary signals to produce corresponding $y$ amplitude signals, where the peak values of the modulated carrier represent the function $y[x(t)]$; and fourth means for applying a signal of a second frequency representing said second independent variable $f(t)$ to said third means, said third means being thereby actuated to produce an output signal representing the multiplication $f(t).y[x(t)]$.

6. The system defined in claim 5 wherein said first means includes a cathode-ray tube having $x$ and $y$ deflection plates and means providing a beam for scanning a mask representing said predetermined function; said first means also including a reading circuit comprising a photocell and amplifier combination for detecting the light resulting from the cathode-ray tube beam scanning of said mask to produce said $y$ boundary signals.

7. The system defined in claim 5 wherein said third means comprises a remote cut-off pentode amplifier stage, said stage including an input impedance for receiving said $y$ boundary signals, and a control grid coupled to said input impedance and biased at a signal level such that said $y$ boundary signals constitute automatic gain control signals for said pentode stage.

8. The system defined in claim 5 wherein said system further includes a carrier band-pass filter and a carrier reject filter coupled to said third means, said carrier band-pass filter being operable to separate said carrier modulated to represent the function $y[x(t)]$ from the composite output signal produced by said third means, and said carrier reject filter being operable to separate out an output signal representing the multiplication $f(t).y[x(t)]$.

9. In a function generator circuit, the combination comprising: a cathode-ray tube having means to produce an electron stream, a fluorescent screen, a mask for said screen, and first and second deflection means to direct the stream of the tube over the screen; a photocell responsive to the light output of said fluorescent screen; a feedback path connected from said photocell to said second deflection means including a variable-gain amplifier to deflect the stream of said tube to the edge of said mask; means to impress an alternating carrier-signal of a predetermined frequency on said variable-gain amplifier in addition to the output of said photocell; means for impressing a first input signal $f(t)$ on said variable-gain amplifier in addition to said carrier signal and the output of said photocell; a filter connected from the output of said variable-gain amplifier to said second deflection means for selectively passing signals of said predetermined frequency but not of the frequency of said input signal $f(t)$, said input signal $f(t)$ having an alternating frequency different from that of said predetermined frequency; means for impressing a second input signal $x(t)$ on said first deflection means; and means to pass said input signal $f(t)$ exclusive of signals of said predetermined frequency.

10. In a function generator circuit, the combination comprising: a cathode-ray tube; means in said tube to produce an electron stream; a fluorescent screen to intercept said stream; a mask for said screen; first deflection means for receiving one input signal to direct said stream over said screen; a photocell responsive to the light output of said screen; a variable-gain amplifier connected from said photocell; means for impressing a plurality of other alternating current input signals of different corresponding frequencies on said amplifier; means for impressing an alternating current carrier signal of a frequency different from that of all of said input signals; an input signal filter at the output of said amplifier to pass each of said other input signals selectively; a carrier signal filter at the output of said amplifier to pass only said carrier signal; and second deflection means connected from said carrier signal filter to deflect said electron stream across said screen in a different direction than that in which said first means deflects it.

References Cited in the file of this patent

UNITED STATES PATENTS

| | | |
|---|---|---|
| 2,415,190 | Rajchman | Feb. 4, 1947 |
| 2,415,191 | Rajchman | Feb. 4, 1947 |
| 2,433,236 | Rajchman et al. | Dec. 23, 1947 |
| 2,497,883 | Harris | Feb. 21, 1950 |

OTHER REFERENCES

MacNee, A. B.: "An Electronic Differential Analyzer," Proc. of IRE, vol. 37, No. 11, November 1949.

Waveforms (Chance et al.), Radiation Laboratory Series, vol. 19, published by McGraw-Hill Book Co., 1949, pages 674–676.

Electronic Analog Computers (Korn & Korn), published by McGraw-Hill Book Co., New York, 1952, pages 247–250.